United States Patent [19]

Chan

[11] Patent Number: 5,012,249

[45] Date of Patent: Apr. 30, 1991

[54] SYNTHETIC APERTURE RADAR SYSTEM HAVING A THIRD ORDER TUNED AUTO COMPENSATOR FOR RESIDUAL ANTENNA MOTION AND METHOD FOR ITS USE

[75] Inventor: Yuen-Kwok Chan, Scarsdale, N.Y.

[73] Assignee: The Boeing Company, Seattle, Wash.

[21] Appl. No.: 442,242

[22] Filed: Nov. 28, 1989

[51] Int. Cl.$^5$ .............................................. G01S 13/90
[52] U.S. Cl. ...................................................... 342/25
[58] Field of Search .......................................... 342/25

[56] References Cited

U.S. PATENT DOCUMENTS

| | | | |
|---|---|---|---|
| 4,134,113 | 1/1979 | Powell | 342/25 |
| 4,617,567 | 10/1986 | Chan | 342/25 |
| 4,771,287 | 9/1988 | Mims | 342/25 |
| 4,837,577 | 6/1989 | Peregrim et al. | 342/25 X |

Primary Examiner—Gilberto Barrón, Jr.
Attorney, Agent, or Firm—Seed and Berry

[57] ABSTRACT

In a SAR system a method is provided for compensating for antenna residual motion relative to a motion sensor, wherein such residual motion causes phase corruption in a radar image produced by the SAR system. Residual motion compensation is provided by first correlating a received radar signal to a range line having a plurality of azimuth positions. Such signal is transformed into a frequency spectrum indicating the reflectivity of point reflectors at the various azimuth positions. Then, the range line is sampled for symmetric sets of sequential point reflectors positioned along the range line at a consecutive distance from each other corresponding to a specified frequency associated to a mode of residual vibration of the antenna. The amplitude and phase angle of said mode of the antenna residual motion may be obtained from such symmetric sets.

15 Claims, 6 Drawing Sheets

SYNTHETIC APERTURE RADAR SYSTEM HAVING A THIRD ORDER TUNED AUTO COMPENSATOR FOR RESIDUAL ANTENNA MOTION AND METHOD FOR ITS USE

TECHNICAL FIELD

This invention relates to synthetic aperture radar (SAR) systems, and more particularly, to a method for compensating for relative motion between an antenna and a motion sensor in a SAR system, wherein such residual motion may cause phase corruption in a radar image.

BACKGROUND ART

In the prior art, there has been a continuing effort to develop radar systems which are suitable for high-resolution applications, such as ground-mapping and air reconnaissance. Initially, this finer resolution was achieved by the application of pulse-compression techniques to conventional radar systems which were designed to achieve range resolution by the radiation of a short pulse, and angular, or azimuth, resolution by the radiation of a narrow beam. The pulse-compression techniques provided significant improvement in the range resolution of the conventional radar systems, but fine angular resolution by the radiation of a narrow beam still required a large-diameter antenna which was impractical to transport with any significant degree of mobility. Subsequent to the development of pulse-compression techniques, synthetic aperture radar (SAR) techniques were developed for improving the angular resolution of a radar system to a value significantly finer than that directly achievable with a radiated beam width from a conventional antenna of comparable diameter.

In the prior art, an equivalent to a large-diameter antenna was established which was comprised of a physically long array of antennas, each having a relatively small diameter. In the case of a long antenna array, a number of radiating elements were positioned at sampling points along a straight line and transmission signals were simultaneously fed to each element of the array. The elements were interconnected such that simultaneously received signals were vectorially added to exploit the interference between the signals received by the various elements to provide an effective radiation pattern which was equivalent to the radiation pattern of a single element multiplied by an array factor. That is, the product of a single element radiation pattern and the array factor resulted in an effective antenna pattern having significantly sharper antenna pattern lobes than the antenna pattern of the single element.

SAR systems are based upon the synthesis of an effectively long antenna array by signal processing means rather than by the use of a physically long antenna array. With an SAR, it is possible to generate a synthetic antenna many times longer than any physically large antenna that could be conveniently transported. As a result, for an antenna of given physical dimensions, the SAR will have an effective antenna beam width that is many times narrower than the beam width which is attainable with a conventional radar. In most applications of SARs, a single radiating element is translated along a trajectory, to take up sequential sampling positions. At each of these sampling points, a signal is transmitted and the amplitude and the phase of the radar signals received in response to that transmission are stored. After the radiating element has traversed a distance substantially equivalent to the length of the synthetic array, the signals in storage are somewhat similar to the signals that would have been received by the elements of an actual linear array antenna.

An SAR can obtain greater resolution than a conventional linear array of equivalent length as a consequence of the noncoherent transmission from the sampling points of the SAR. The stored SAR signals are subjected to an operation which corresponds to that used in forming the effective antenna pattern of a physical linear array. That is, the signals are added vectorially, so that the resulting output of the SAR is substantially the same as could be achieved with the use of a physically long, linear antenna array.

In generating the synthetic antenna, the signal processing equipment of an SAR operates on a basic assumption that the radar platform travels along a straight line trajectory at a constant speed. In practice, an aircraft carrying the radar antenna is subject to deviations from such nonaccelerated flight. It is therefore necessary to provide compensation for these perturbations to straight-line motion. This motion compensation must be capable of detecting the deviation of the radar platform path from a true linear path.

Figure 1:
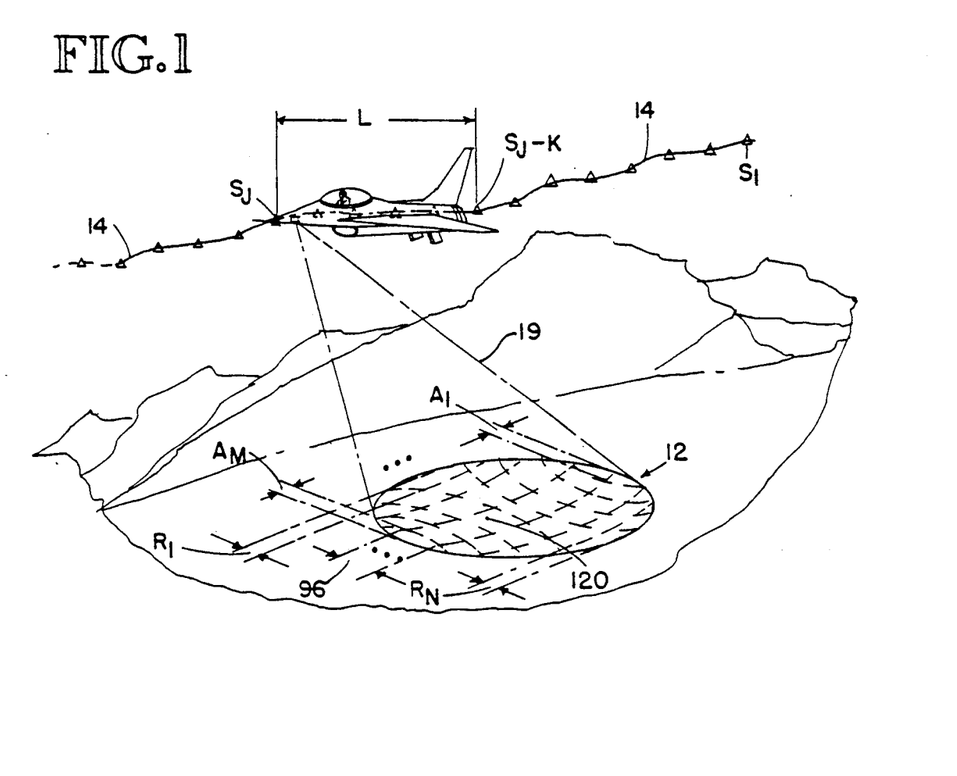
FIG. 1 is a pictorial view of an aircraft following a certain flight path and mapping terrain with an SAR system.
Figure 2:
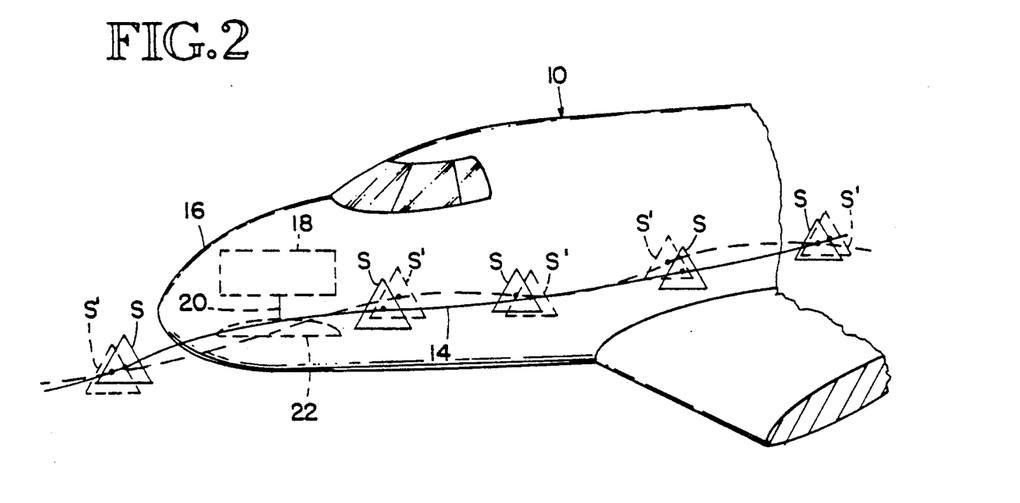
FIG. 2 is an enlarged fragmentary pictorial view of the nose portion of the aircraft shown in FIG. 1, and shows the physical separation of an SAR antenna from an INS.

Briefly, and referring now to FIG. 1 in the drawings, an SAR system carried by an aircraft 10 maps a target region 12 by transmitting and receiving radar signals at various sampling points $S_1, \ldots, S_N$, along the flight path 14 of the aircraft. The SAR system may be positioned in the nose portion 16 of the aircraft 10, for example (see FIG. 2). The SAR will typically require an inertial navigation system (INS) 18 for calculating the position of the antenna 22 at the sampling points $S_i$. However, in addition to the problems discussed above, the antenna 22 may be physically separated from the INS 18 by a physical support, such as a lever arm 20, for example. The flexible modes of the lever arm cause the data indicating the position of the antenna 22 to be imprecise. Thus, the antenna 22 may deviate from the position as reported by the INS 18. In other words, and referring now to FIG. 2, at every sampling point $S_i$ in the flight path 14, the antenna 22 may be displaced slightly to a position denoted $S_i'$. This is referred to as residual antenna motion. If not compensated for, residual antenna motion will corrupt the signal phase, possibly to the extent that the resulting degraded image is of no practical use. The severity of the problem increases with the desired resolution.

The residual motion can be alleviated (at least in the frequency region where the energy of the disturbance concentrates) by stiffening the antenna lever arm sufficiently. However, this would add to the weight and the cost of the SAR system. Moreover, such a solution would not cover other sources of residual motion, e.g., flexible modes in the antenna itself or slow INS report rates.

An accelerometer or a full INS on the antenna itself would provide more accurate readings of the antenna position. This, however, would add extra expense, and the resolution of the SAR would still be limited by the accuracy and/or report rates of the INS. In addition, flexible modes in the antenna would still produce errors.

By analyzing the received signal, in some situations certain types of residual motion can be removed. These signal analysis techniques are generally known as autofocusing. One technique, feature referenced autofocusing, arises from the fact that if subapertures are formed from different periods of the integration time, the corresponding images have position shifts corresponding to the almost constant rates of phase change across the subapertures. These nearly linear phase histories can then be pieced together to yield an estimate of the residual motion. This method, however, works well only if the residual motion is of low frequency; it is mainly used to remove second order residual motions.

Another technique is to correct the errors by using dominant point targets. In this technique, the main antenna beam is first divided into subbeams. If there is a dominant scatterer in a certain range cell within a subbeam, the corresponding time signal will have a linear phase on which is superimposed the residual motion. The latter can thus be estimated as deviations from the linear phase. The estimates corresponding to the various such dominant scatterers are then averaged to provide a single estimate of the residual motion. This technique works well if: (i) there is a reasonable number of dominant scatterers in the scene and (ii) the residual motion does not contain frequencies so high that energy from dominant scatterers leaks across subbeams. When the dynamic range of the scene is small (as would often be the case when no man-made objects are present or when attempt is made to lower the transmission power), the condition (i) may not be satisfied with large subbeams. Decreasing the size of subbeams would likely violate condition (ii).

The technique described above can be simplified, resulting in the so-called radio camera algorithm. This algorithm isolates those range lines which are composed of a point reflector dominating the whole range line. This technique suffers the same limitations as that described above, only to a greater extent.

A further technique, described in U.S. Pat. No. 4,617,567, is termed a tuned autocompensator. The tuned autocompensator has been proposed to examine range lines for symmetric triplets of apparent reflectors situated at a distance from one another corresponding to some characteristic frequency of the residual motion. Such a triplet would come from the main antenna lobe and first order side lobes arising from a point reflector. By processing the triplets, estimates of magnitude and phase of the residual motion at a characteristic frequency can be obtained. This technique performs well when magnitude of the residual motion is less than a fraction of the carrier wavelength, but not otherwise.

The present invention provides a method for compensating for antenna residual motion in an SAR system. The described invention will use signal processing means to estimate the residual antenna motion from the received signal and subsequently remove its effect on the image. This will be referred to as an autocompensator.

A novel idea of this invention is that when the magnitude of a sinusoidal residual motion exceeds a fraction of the carrier wavelength, not only the fist order side lobes but also the second order, and, in rare situations, the third order side lobes are necessary for the determination of the residual motion magnitude and phase. Moreover, along with the main antenna lobe, the side lobes of order up to three are always sufficient for that purpose.

DISCLOSURE OF THE INVENTION

In an SAR system that receives reflections of radar signals from a target region, the present invention provides a method for correcting the position signals derived from a motion sensor to compensate for antenna residual motion that may cause phase corruption in the radar image. A received radar signal is transformed into a range line having a plurality of azimuth positions. The received signal is transformed into a frequency spectrum indicating the reflectivity of point reflectors at a plurality of azimuth positions, one point reflector being located at each azimuth position and each point reflector being represented by a complex member having a certain magnitude and phase angle. The range line is sampled for substantially symmetric sets of point reflectors separated consecutively from each other by a distance corresponding to a frequency. The frequency corresponds to a mode of residual vibration of the antenna and the substantially symmetric set includes a main lobe point reflector, a pair of first order point reflectors, and a pair of second order point reflectors. Each of the point reflectors is represented by a complex number, with said main lobe point reflector being centrally positioned between said pairs of first and second order point reflectors. The method also comprises the steps of calculating a product of a predetermined threshold with the greater magnitude of the two complex numbers $f(x-\theta)$ and $f(x+\theta)$, representing the pair of first order point reflectors and comparing the product with the magnitude of the complex number $f(x)$ representing the main lobe point reflector.

Further, the method establishes first and second criteria of a symmetry relation which depend upon whether the magnitude of the complex number representing the main lobe point reflector is greater or less than the product of the predetermined threshold with the greater magnitude of the two complex numbers representing the pair of first order point reflectors. These criteria are applied to determine whether the complex numbers representing the main lobe point reflector, the pair of first order point reflectors, and the pair of second order point reflectors meet the first or second symmetry relation, depending upon the result of the comparison step. Next, estimates of the amplitude and phase of the antenna residual motion are calculated, depending upon the result of the comparison step. Further, the method includes the steps of generating an antenna residual motion signal from the estimates of the amplitude and phase of the antenna residual motion, and combining the antenna residual motion signal with the position signals from the motion sensor, to correct for antenna residual motion between the motion sensor and the antenna.

In another aspect, the invention is an autocompensator for an SAR system that receives reflections of radar signals from a target region, wherein such signals are combined with position signals from a motion sensor indicating antenna position. The autocompensator corrects the position signals from the motion sensor to compensate for the amplitude and phase of antenna residual motion that may cause phase corruption in the radar image. The reflected signals and the position signals are integrated into range lines that may be combined to form a radar image. The autocompensator comprises means for transforming a received radar signal into a range line having a plurality of azimuth positions, means for transforming said received signal into a frequency spectrum f indicating the reflectivity of point reflectors at said azimuth positions, wherein one point reflector is located at each azimuth position, and wherein each point reflector is represented by a complex number having a certain magnitude and phase angle, and means for sampling the range line for substantially symmetric sets of point reflectors separated consecutively from each other by a distance corresponding to a frequency $\theta$, wherein said frequency corresponds to a mode of residual vibration of the antenna, and wherein said substantially symmetric set includes a main lobe point reflector, a pair of first order point reflectors, and a pair of second order point reflectors, each of said point reflectors being represented by a complex number, with said main lobe point reflector being centrally positioned between said pairs of first and second order point reflectors. The autocompensator further comprises means for calculating a product of a predetermined threshold $\epsilon$ with the greater magnitude of the two complex numbers $f(x-\theta)$ and $f(x+\theta)$, representing the pair of first order point reflectors, means for comparing the product with the magnitude of the complex number $f(x)$ representing the main lobe point reflector, and means for establishing first and second criteria of a symmetry relation, depending upon whether the magnitude of the complex number representing the main lobe point reflector is greater or less than the product of the predetermined threshold with the greater magnitude of the two complex numbers representing the pair of first order point reflectors. In addition, the autocompensator comprises means for determining whether the complex numbers representing the main lobe point reflector, the pair of first order point reflectors, and the pair of second order point reflectors meet the first or second symmetry relation, depending upon the result of the comparison of the product with the magnitude of the complex number $f(x)$ representing the main lobe point reflector, means for calculating estimates of the amplitude and phase of the antenna residual motion, depending upon the result of the comparison of the product with the magnitude of the complex number $f(x)$ representing the main lobe point reflector, and means for generating an antenna residual motion signal therefrom.

In a further aspect, the invention is an SAR system, comprising means for transmitting radar signals to a target region, means for receiving the reflections of the radar signals from the target region, means for producing position signals from a motion sensor indicating antenna position, and an autocompensator. The autocompensator comprises means for transforming a received radar signal into a range line having a plurality of azimuth positions, means for transforming said received signal into a frequency spectrum f indicating the reflectivity of point reflectors at said azimuth positions, wherein one point reflector is located at each azimuth position, and wherein each point reflector is represented by a complex number having a certain magnitude and phase angle, and means for sampling the range line for substantially symmetric sets of point reflectors separated consecutively from each other by a distance corresponding to a frequency $\theta$, wherein said frequency corresponds to a mode of residual vibration of the antenna, and wherein said substantially symmetric set includes a main lobe point reflector, a pair of first order point reflectors, and a pair of second order point reflectors, each of said point reflectors being represented by a complex number, with said main lobe point reflector being centrally positioned between said pairs of first and second order point reflectors. The autocompensator further comprises means for calculating a product of a predetermined threshold $\epsilon$ with the greater magnitude of the two complex numbers $f(x-\theta)$ and $f(x+\theta)$, representing the pair of first order point reflectors, means for comparing the product with the magnitude of the complex number $f(x)$ representing the main lobe point reflector, and means for establishing first and second criteria of a symmetry relation, depending upon whether the magnitude of the complex number representing the main lobe point reflector is greater or less than the product of the predetermined threshold with the greater magnitude of the two complex numbers representing the pair of first order point reflectors. In addition, the autocompensator comprises means for determining whether the complex numbers representing the main lobe point reflector, the pair of first order point reflectors, and the pair of second order point reflectors meet the first or second symmetry relation, depending upon the result of the comparison of the product with the magnitude of the complex number $f(x)$ representing the main lobe point reflector, means for calculating estimates of the amplitude and phase of the antenna residual motion, depending upon the result of the comparison of the product with the magnitude of the complex number $f(x)$ representing the main lobe point reflector, and means for generating an antenna residual motion signal therefrom.

BEST MODE FOR CARRYING OUT THE INVENTION

Figure 3:
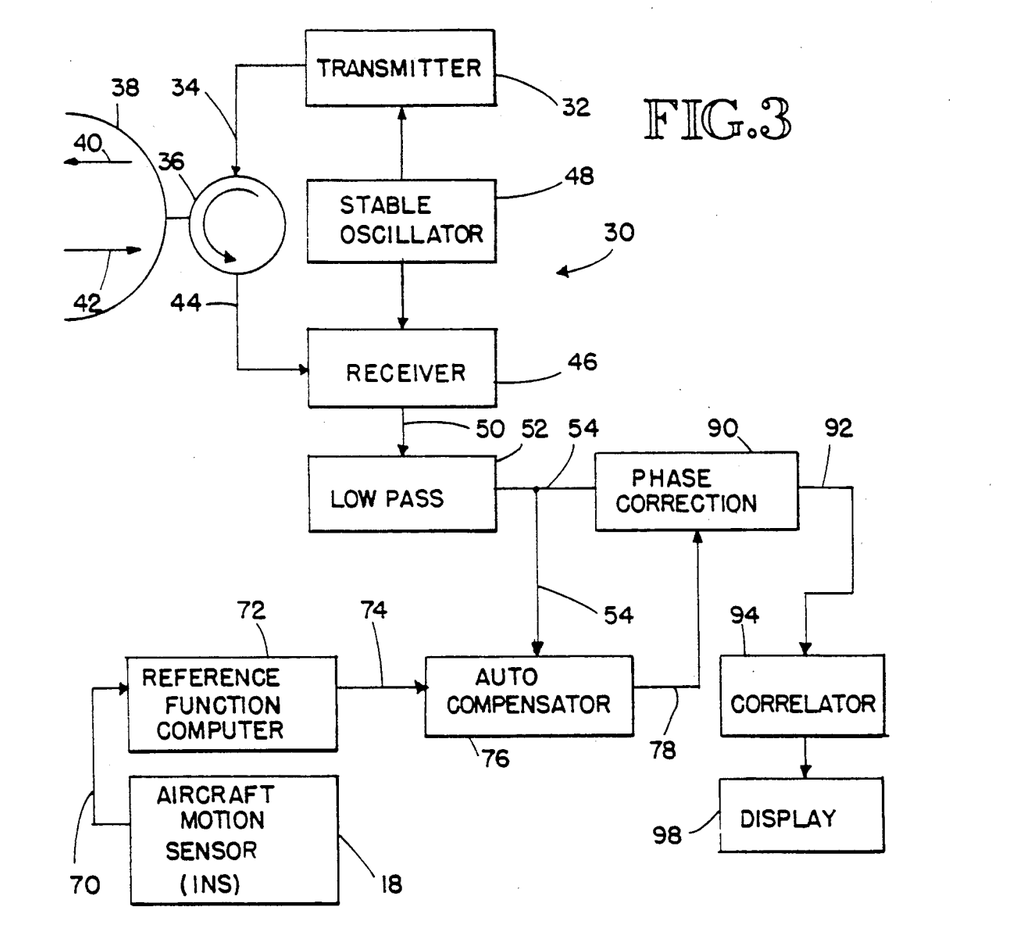
FIG. 3 is a schematic block diagram of a typical SAR system constructed in accordance with an embodiment of the present invention.

Referring now to the drawings, and first to FIG. 3, a synthetic aperture (SAR) system therein is indicated generally by reference numeral 30. The construction of the SAR system 30 is typical of most SAR systems. To briefly describe the system 30, a radar signal having a certain frequency is generated by a transmitter 32. The generated signal is sent (indicated by arrow 34) to a duplexer 36 (or circulator) where it is further transmitted to an antenna 38. The signal is then transmitted from the antenna 38 to a particular target region such as an area of terrain 12 (see FIG. 1). A portion of the signal is reflected off the terrain 12 back to the antenna 38. In FIG. 3, transmission of the signal by the antenna 38 to the target region 12 is indicated generally by arrow 40, while reception of the reflected signal is indicated generally by arrow 42. The received signal is transmitted back to the duplexer 36, which forwards the received signal (indicated generally by arrow 44) to a receiver 46.

The SAR 30 may include a stable oscillator 48 that is provided for correlating the phase relationship between the signal that is generated by the transmitter 32 and the reflected signal that is processed by the receiver 46. The reflected signal received by the receiver 46 is an analog signal. After processing by the receiver 46, the reflected signal is then integrated with other received signals over time into range lines that generate an image of the target region 12.

Range compression techniques which effectively yield a number of signals corresponding to a number of range lines are well-known in the art. For the sake of simplicity, then, the following description and discussion of the instant invention will be conducted in reference to only one range line and one corresponding signal. Keeping this in mind, the reflected signal is then mixed with a reference signal from the stable oscillator 48. This results in a signal 50, consisting of a sequence of digital pulses, each of which is represented by a complex number having a particular value that is constant within the pulse. This digital signal 50 is then transmitted to a low pass filter 52 which filters the signal 50 and slows the data rate.

Figure 4:
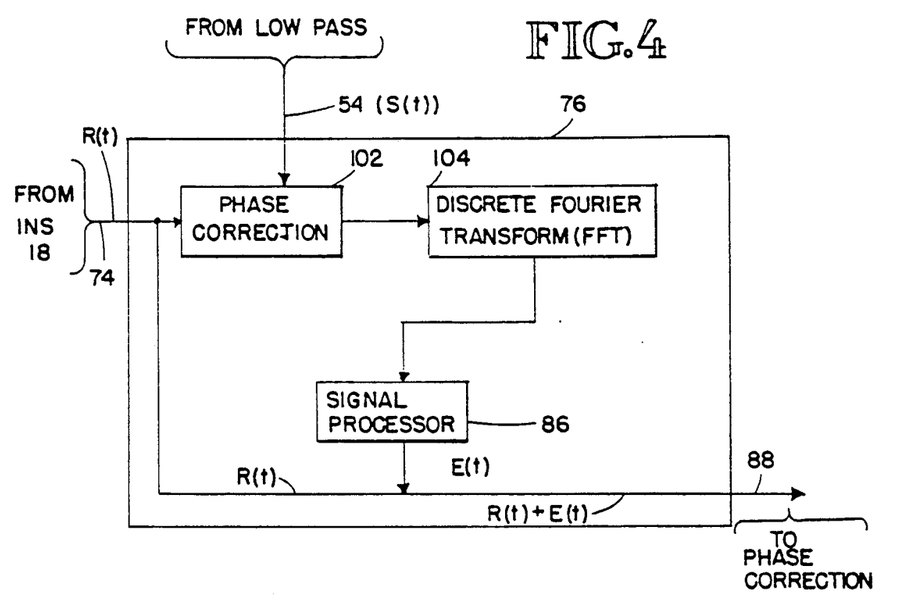
FIG. 4 is a schematic block diagram showing the production of a residual motion-compensated antenna motion history signal.

The low pass filtered digital signal 54 must be motion compensated and correlated to produce an image of the target region 12. Before this is done, however, the digital signal 54 is first processed to determine residual motion of the antenna 38. Referring also to FIG. 4, this processing step is schematically illustrated and will now be described.

The INS 18 senses position information concerning the aircraft 10 that is used to calculate the position of the antenna 38. With this position information, the transmitted and received radar signals 40, 42 may be properly integrated to produce an image of the target region 12. Typically, the INS 18 sends a position signal (indicated generally by arrow 70) to a reference function computer 72. The reference function computer 72 then generates an antenna position signal 74 that is transmitted to an antenna residual motion compensator or an autocompensator 76.

The position signal 74 is also indicated in FIG. 4 by the symbol R(t). The position signal R(t) as supplied from the reference function computer 52 does not, however, take into account antenna residual motion. A signal processor 86 generates such a component, which is indicated by the function E(t) in FIG. 4, and which is combined with the position signal R(t). In other words, the residual motion signal E(t) corrects the position signal R(t) to compensate for antenna residual motion. The combined signal R(t)+E(t) is then output from the autocompensator 76 and transmitted (indicated generally by arrow 88) to correct the phase of the output signal of the low pass filter 52 (see FIG. 3).

The output signal 88 of the autocompensator 76 may generally be referred to as an antenna motion history. The signal is combined with the digital signal 54 created by the low pass filter 52 by a phase correction portion 90 of the SAR 10. In the phase correction portion 90, the antenna motion history signal 78 is used to adjust the phase of the filtered signal 54. The amount of such adjustment may be indicated by $$\hat{S}(t) = S(t) - [R(t) + E(t)], \quad \text{Eq. 1}$$

in which $\hat{S}(t)$ is the motion compensated reflected signal of a range line, $S(t)$ is the reflected signal before motion compensating of a range line, and $[R(t)+E(t)]$ is the antenna motion history including an antenna residual motion history.

After adjusting the phase of the signal 54, the motion compensated signal (indicated generally by arrow 92) is transmitted to a signal correlator 94. The signal correlator 94 correlates the motion compensated signal 92 into a range line $R_i$ 96 (see FIG. 1). A plurality of range lines may be combined to produce an image of the target region 12 on a display 98.

The SAR system 30 as thus described herein is familiar to a person skilled in the art. Except for the compensator 76, a person skilled in the art would be familiar with the elements of the system 30, and their functions. The need to have the autocompensator 76 to correct position information or signals provided by the INS 18 would be apparent to a person skilled in the art after having read this introductory section, since residual motion of the antenna 18 relative to the INS 18 causes corruption of an image produced on the display 98. The method by which the autocompensator 76 corrects the position signals from the INS 18 will now be explained.

Referring again to FIG. 4, in a preferred form, the autocompensator 76 will take the form of a digital data processor. The autocompensator 76 will have a phase correction portion 102 that first corrects the phase of the digital signal 54 by using the position history R(t) 74 as reported by the INS 18. The autocompensator 76 then uses a discrete Fourier transform (DFT) 104 (preferably a fast Fourier transform (FFT)) that transforms the phase corrected signal into a frequency spectrum, with the frequencies of such spectrum corresponding to the azimuth position on a particular range line 96. This spectrum for the range line 96, which is in digital form, is then processed by the signal processor 86 in the autocompensator 76 to determine antenna residual motion.

Figure 5:
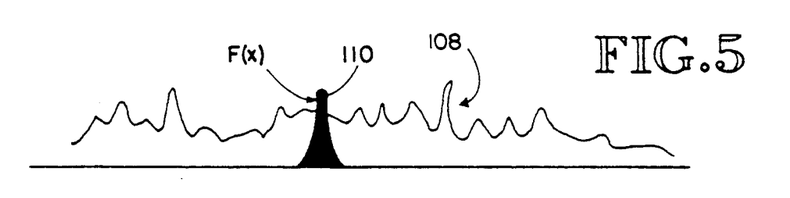
FIG. 5 is a graph showing the radar reflectivity of a range line pertinent to an SAR system.

Point reflectors in the target region situated at the various azimuth positions across the range line 96 give rise to various intensities at various frequencies of the spectrum. This is generally illustrated in FIG. 5, wherein the image associated with the range line 96 (FIG. 1) is represented by the spectrum 108. Since there is a one-to-one correspondence between the reflectivity along the range line 96 and the associated frequency spectrum, the terms "range line" and "frequency spectrum" may be used interchangeably. In the spectrum 108 there is shown a main lobe 110 that represents one particular point reflector in the range line 96.

Figure 6:
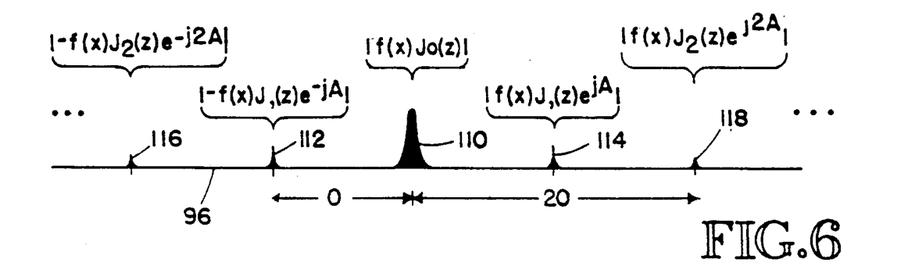
FIG. 6 is a graph showing a corrupted image of a point reflector in the range line of FIG. 5, and showing spurious side lobes that would result from a sinusoidal component of the residual antenna motion if no other reflectors were present in the range line.

Residual motion of the antenna 18 consists of one or more components that are sinusoidal. As a result of such sinusoidal motion components, each point reflector in the spectrum gives rise to a pair of spurious side lobes. This is illustrated schematically in FIG. 6, wherein the reflector represented by main lobe 110 gives rise to spurious first order side lobes 112 and 114, respectively, and spurious second order side lobes 116 and 118, etc. The first order spurious side lobes 112, 114 are situated equidistant from the main lobe 110 at a distance of $\pm\theta$ Hertz (Hz). The second order spurious side lobes 116 and 118 are located a distance of $\pm 2\theta$ from main lobe 110. The difference $\theta$ corresponds to the frequency of the particular sinusoidal residual motion component of the antenna 38 that is being considered by the autocompensator 76. For example, such sinusoidal component may be defined by $$E(t) = z \sin(\theta t + a), \qquad \text{Eq. 2}$$

in which E(t) is the antenna residual motion component being considered, z is the amplitude of the residual motion component, $\theta$ is the frequency of the residual motion component, and a is the phase angle of the residual motion component.

If the frequency of a sinusoidal component of the residual motion can be specified, and if the amplitude z and the phase a can be determined, then the antenna residual motion component signal can be generated to correct the position signal R(t) received from the INS 18. The frequencies of prevailing components of the antenna residual motion may be estimated by measurement. I have discovered that the symmetrical reflectivity relationship between the spurious higher-order side lobes 112, 114, 116, 118, etc., and the main lobe 110 is common to all reflectors in all range lines 96, subject to "noise" which can be filtered out. Hence, such symmetrical relationship may be used to calculate the required amplitude z and phase a of the antenna residual motion.

Because of sinusoidal phase corruption due to antenna residual motion, a point reflector 120 situated at an azimuth position X along the range line 96 (see FIGS. 1, 4–6) will give rise to a main lobe 110 with an intensity f(x) that is reduced by a factor equal to $J_o(Z)$ where $J_k$ is a kth order Bessel function. This results in an intensity of $f(x)J_o(Z)$, whereas f(x) would be the intensity if no corruption were present. The point reflector 120 also produces pairs of spurious side lobes positioned at $X\pm\theta$, respectively, having intensities of $f(x)J_k(z)e^{jka}$ and $-f(x)J_k(z)e^{-jka}$, respectively (for k=1, 2, ...).

Figure 7:
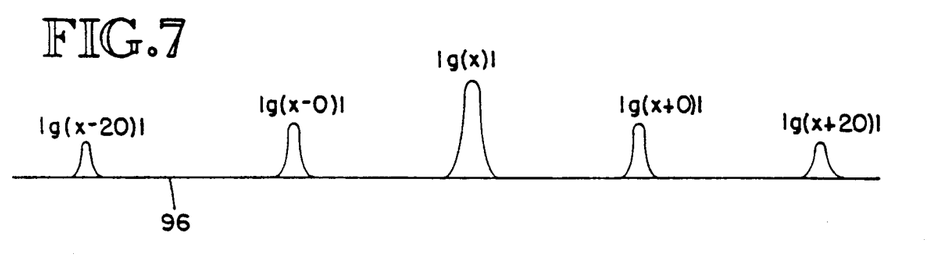
FIG. 7 is a graph showing the relationship between intensities of the main and spurious side lobes of FIG. 6 in the presence of other reflectors in the range line.

Referring now to FIG. 7, let the expression of g(x) be used to denote the phase corrupted image resulting from antenna residual motion. If only one reflector having a reflectivity f(x) is present in the range line 96 at the position x, then $$g(x) = f(x)J_o(z),$$

$$g(x + \theta) = f(x)J_1(Z)e^{ja},$$

$$g(x - \theta) = -f(x)J_1(Z)e^{-ja}.$$

If this is the case, then $$g(x+\theta)/g(x) = [J_1(Z)/J_0(Z)]e^{ja}$$

$$-g(x+\theta)/g(x) = [J_1(Z)/J_0(Z)]e^{-ja},$$

these latter two equations representing phasors that are complex conjugates of each other. In other words, the sum of one of these two equations and the negative of the complex conjugate of the other will be zero, or within a threshold value that is approximately equal to zero. What this means is $$[g(x+\theta)/g(x)] + [g(x-\theta)/g(x)]^* \doteq 0$$

wherein, as elsewhere in this description a superscript asterisk denotes a complex conjugate.

The residual motion of the antenna 22 is actually the sum of a number of components, each being a sinusoidal motion at a characteristic frequency and with amplitude and phase to be estimated. The severity of the estimation problem increases with the desired resolution. Components of different characteristic frequencies will be treated one by one. Such characteristic frequencies can be obtained from the power spectral density of the antenna system in a laboratory test. The power spectral density can also be obtained from radar returns of a point reflector in flight tests. In any case, the knowledge of the characteristic frequencies need not be very precise, because the autocompensator can be tuned not just to any signal frequency, but to several bands which will certainly include the characteristic frequencies. In the remainder of this detailed description, the basic equations and notations to be used are introduced.

Assume that range compression has already been performed, so that effectively there is a radar return signal for each range line. Thus, for every range line, the signal S(t) has the form $$S(t) = \exp(j4\pi/\lambda)[R(t) + E(t)] \times \qquad \text{Eq. 3}$$

$$\int_0^{x_1} \exp[(j4\pi/\lambda)\theta(t)X]F(X)dX$$

where F is the reflectivity along the range line in question, X is the azimuth position of reflectors in the range line, $\lambda$ is the carrier wavelength, t is time, $\theta$ is the azimuth position of the airplane at time t, R is the distance of the antenna from the map center as calculated from data from the inertial navigation system, E is the residual error of the antenna position along the line of sight, and the range of integration covers the entire illuminated portion of the range line 96.

For simplicity of discussion, assume that the angular velocity of the aircraft 10, as seen from the point 120, is constant during the integration time. Also, assume that the usual motion compensation has been performed, i.e., the known quantity R(t) has been removed from the phase of the signal S(t), resulting in a signal $$S(t) = \exp[je(t)]\int_0^{x_1} \exp(j2\pi tx)f(x)dx, \qquad \text{Eq. 4}$$

where $e(t) = 4\pi E(t)/\lambda$, $x = 2\pi X/\lambda$, and $f(x) = F(X)\lambda/2\pi$.

If there were no residual motion e(t), then a reflector at X will show up as a spike at x Hertz in the spectrum of the signal S. The azimuth position of this reflector can therefore be referred to as being at x Hertz. Now assume that the signal S(t) is sampled at $t=0, \Delta, 2\Delta, \ldots, (N-1)\Delta$, where $\Delta = 1/x1$ and $T = (N-1)\Delta$ is the length of the integration time. The azimuth resolution in Hertz is then $\delta = x1/N = 1/T$. If the azimuth cell reflectivities $f_m$ are defined by $$f_m = \int_{m\delta}^{(m+1)\delta} \exp(j2\pi(x - m\delta))fd(x)dx$$
$$(m = 0, \ldots, N-1)$$

then Equation 4 can be rewritten as $$S(k\Delta) = \exp je(k\Delta) \sum_{m=0}^{N-1} \exp(j2\pi km/N)f_m \; (k = , \ldots, N-1) \qquad \text{Eq. 5}$$
$$= \exp je(k\Delta) \hat{f}_k,$$

where $\hat{f}$ stands for the inverse discrete Fourier transform (DFT) of f, and f could be found by a DFT operation if the phase error e(t) were not present.

If the phase error consists of a number of sinusoidal components $$e(k\Delta) = e1(k\Delta) + e2(k\Delta) + \ldots (k = 0, \ldots, N-1)$$

then the DFT of Eq. 5 produces a corrupted version of f, $$g = h1^* h2^* \ldots ^* f \qquad \text{Eq. 6}$$

where g, h1, h2, ... are the DFTs of S, exp (je1), exp(je2), ..., respectively (see FIG. 7). In terms of the image, $g_m$ (respectively $f_m$) will be referred to as the intensity at the pixel m in the corrupted (respectively uncorrupted) image. Here, as usual, the pixel subscript m will be interpreted as m mod N.

Consider now just one sinusoidal component e1 of the residual motion, say at x Hertz, with magnitude z and phase a to be estimated. From the Bessel function expansion $$\exp je1(k\Delta) = \exp (jz \sin(2\pi q\delta k\Delta + a))$$
$$= \exp (jz \sin(2\pi qk/N + a))$$
$$= \sum_{n=-\infty}^{\infty} J_n(z)\exp(jn(2\pi qk/N + a))$$

where $J_n(z)$ is the nth order Bessel function.

Equation 5 can be written as $$S(k\Delta) = \left( \sum_{n=-\infty}^{\infty} J_n(z)\exp(j\xi(2\pi qk/N + a)) \right) \hat{f1}(k\Delta), \qquad \text{Eq. 7}$$

where $\hat{f1}$ is the signal with the component e1 removed from the phase. Clearly f1 is the inverse of DFT of $$f1 = h2^* h3^* \ldots ^* f.$$

From equation 7 it can be seen that $$g_m = \sum_{n=-\infty}^{\infty} J_n(z)\exp(jnp)f1_{m-qn}. \qquad \text{Eq. 8}$$

If only one reflector were present in the image range line f1, say situated at pixel m, then according to Eq. 8, the following symmetric sets of DFTs result:

$$\ldots, \qquad \text{Eq. 9}$$
$$g_{m-2q} = J_{-2}(z)\exp(-j2a)f1_m,$$
$$g_{m-q} = J_{-1}(z)\exp(-ja)f1_m,$$
$$g_m = J_0(z)f1_m,$$
$$g_{m+q} = J_1(z)\exp(ja)f1_m,$$
$$g_{m+2q} = J_2(z)\exp(j2a)f1_m,$$
$$\ldots$$

The autocompensator 76 is tuned to a specific frequency of the residual motion. Let $\theta$ denote the (assumed known) frequency of the residual antenna motion, and let z and a respectively denote the (unknown) amplitude and phase. Because of the sinusoidal residual antenna motion, a point reflector situated at the azimuth position corresponding to frequency x actually gives rise to not only the main peak at x but also spurious side peaks at frequencies $x \pm \theta$, $x \pm \theta$, ... Moreover, the reflectivity at the main peak and at these side peaks are modulated in magnitude by $J_0(z)$, $J_{\pm 1}(z)$, $J_{\pm 2}(z)$, ... and phase shifted by 0, $\pm 1$, $\pm 2$, ... respectively. Let $g(x)$ denote the actual reflectivity at x and let f(x) denote the corrupted image. If, at some point x, g(x) dominates $g(x \pm \theta)$, $g(x \pm 2\theta)$, then $f(x+k\theta)$ is approximately equal to $$g(x) J_k(z) \exp(jka)$$

for $k = 0, \pm 1, \pm 2 \ldots$ In particular, the symmetric set $\ldots, f(x - 2\theta), f(x - \theta), f(x), f(x + \theta), f(x + 2\theta), \ldots$, has an approximately symmetric relation in the complex plane, thanks to the higher order side peaks. To the extent that g(x) fails to dominate other reflectors and their side peaks, the symmetric relations are corrupted by noise.

Since the reflectivity g is yet to be obtained, the symmetric relation has to be determined in terms of the corrupted image f. This can be conveniently divided into two categories, depending upon the magnitude of f(x) relative to $f(x - \theta)$ and $f(x + \theta)$. These two categories are:

case 1 $f(x) > \epsilon \max(|f(x - \theta)|, |f(x + \theta)|)$, and case 2 $f(x) < \epsilon \max(|f(x - \theta)|, |f(x + \theta)|)$, where $\epsilon$ is the threshold value.

Case 1

Figure 8:
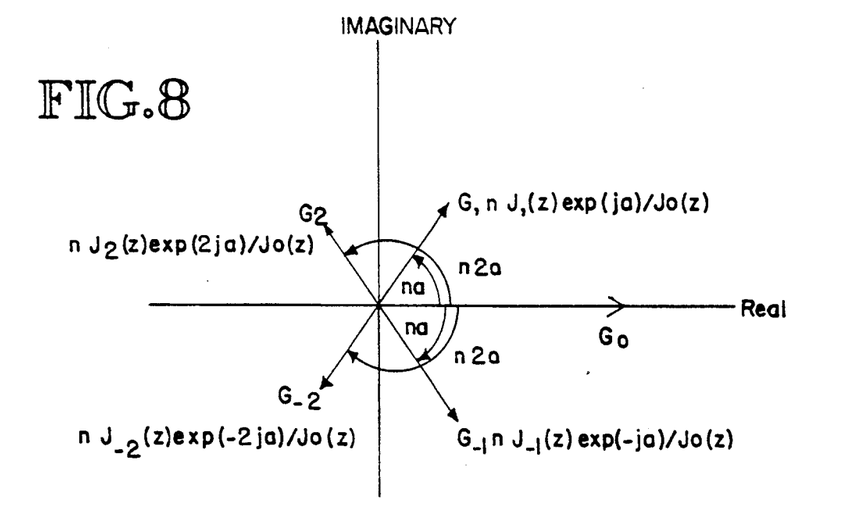
FIG. 8 is a plot in the complex plane of the ratios of the complex intensities of the side lobes to the complex intensity of the main lobe of FIG. 7, where the magnitude of the main lobe is greater than or equal to the product of a weighting threshold parameter and the greater magnitude of the two first order side lobes.

If $-f(x - \theta)$ and $f(x + \theta)$ are approximately mirror images of each other relative to a line in the complex plane through the origin and f(x), then a symmetry relation can be declared, and $f(x+k\theta)/f(x)$ ($k = \pm 1, \pm 2, \pm 3$) are used as estimates of $J_k(z) \exp (jka)/J_0(z)$. For each $k = \pm 1, \pm 2, \pm 3$, these estimates obtained from different reflector positions x and different range lines can be weighted and averaged to yield estimates $G_k$ for $J_k(z) \exp (jka)/J_0(z)$, as shown in FIG. 8.

The phase angle a is then estimated from the angle of one of the following differences: $G_1G_0$, $G_0 + G_{-1}$, $-G_{-1} - G_{-2}$, or $G_2 - G_1$; or from a combination of these angles.

The magnitude z is then estimated by $$z = 2G_1 \exp (-ja)/(1 + G_2 \exp (+2ja))$$

when the denominator in the displayed equation is not approximately zero, or by $$z = 4G_2 \exp(-ja)/(G_1 + G_3 \exp(-2ja))$$

if the said denominator is approximately zero.

Case 2

Figure 9A:
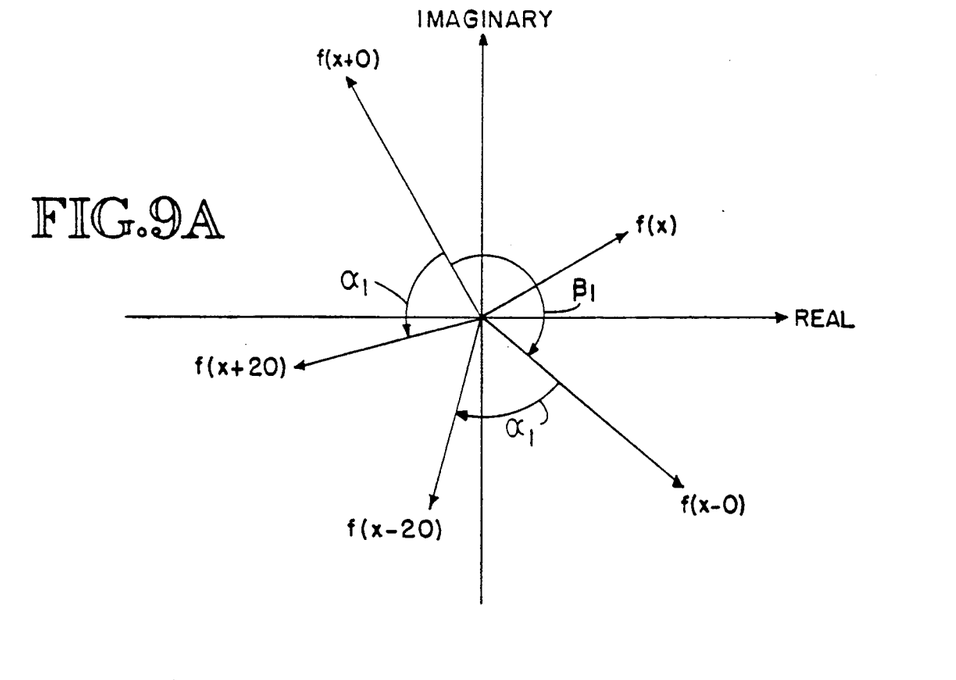
FIG. 9A is a plot in the complex plane of the complex intensities of the side lobes to the complex intensity of the main lobe of FIG. 7, where the magnitude of the main lobe is less than the product of a weighting threshold parameter and the greater magnitude of the two first order side lobes.

A symmetry relation is declared if
(i) $|f(x-\theta)| \sim |f(x+\theta)|$,
(ii) $|f(x-2\theta)| \sim |f(x+2\theta)|$,
(iii) Angle of $-f(x-\theta)-f(x-2\theta) \sim$ angle of $f(x+2\theta)-f(x+\theta)$, and
(iv) Angle of $f(x+\theta)-f(x-\theta) \sim$ twice the angle of $f(x+2\theta)-f(x+\theta)$,
where, for two numbers u and v, the symbol $u \sim v$ means $|u-v| < \epsilon_1(1+|u|+|v|)$ for some threshold $\epsilon_1$, and where all angles take values in the interval $[0, 2\pi)$. This situation is shown in FIG. 9A, where f(x) is less than the product of a threshold parameter with the greater magnitude of the two first side lobes, $|f(x+\theta)|$ and $|f(x-\theta)|$.

Figure 9B:
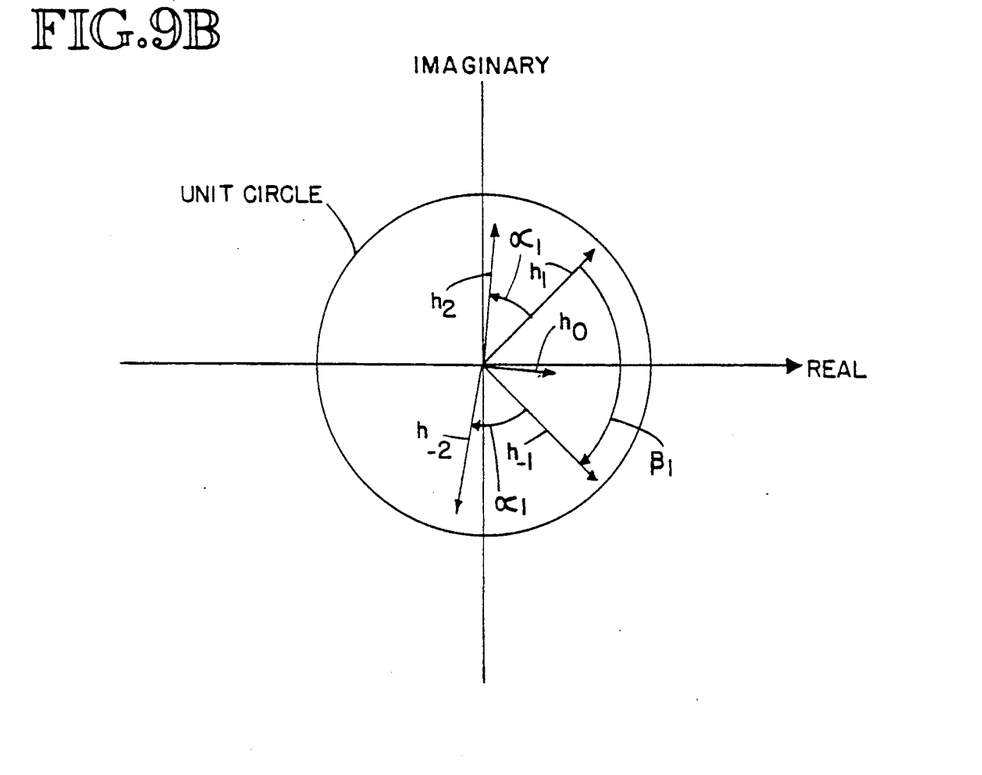
FIG. 9B is a plot in the complex plane of the ratios of the complex intensities of the side lobes to the complex intensity of the main lobe of FIG. 9A, where the magnitude of the main lobe is less than the product of a weighting threshold parameter and the greater magnitude of the two first order side lobes.

When a symmetry relation is so declared, the quintuple $(f(x-2\theta), f(x-\theta), f(x), f(x+\theta), f(x+2\theta))$ of points in the complex plane is first divided by $f(x+\theta) \sim -f(x-\theta)$ and rotated as a whole in the complex plane by that angle in relation (iii) above. The resulting quintuple will be denoted by $(h_{-2}, h_{-1}, h_0, h_1, h_2)$, and is shown in FIG. 9B, where $h_0$ lies approximately on the real axis and one of $h_1$ and $h_{-1}$ lies exactly on the unit circle while the other lies approximately on the unit circle. Then $h_k$ are used as estimates of $J_k(z) \exp(jka)/J_1(z)$. For each $k=0, \pm 1, \pm 2$, these estimates obtained from different reflector azimuth positions x and different range lines can be weighted and averaged to yield estimates $H_k(z) \exp(jka)/J_1(z)$. The phase angle a is then estimated from the angles of $-H_{-1}-H_{-2}$, or half the angle of $H_1+H_{-1}$, or the angle of $H_2-H_1$, or from a combination of these angles. The magnitude z is then estimated by $$z = 2/[H_0 + H_2 \exp(-2ja)].$$

There are, of course, generally more than one reflector in each range line. The symmetric relations described above and the corresponding estimates are then not exact, but corrupted by "noise". However, there is one such estimate for each pixel in each range line. By averaging this large number of noisy estimates, it is possible to obtain accurate estimates for the quantities $J_k(z)\exp(jka)/J_0(z)$. The quality of these overall estimates can be improved by admitting only those symmetric sets $\ldots, g_{m-2q}, g_{m-q}, g_m, g_{m+q}, g_{m+2q}, \ldots$, for which the symmetric relations hold to within some preset threshold $\epsilon_1$.

After z and a are estimated, the component e1 can be removed from the phase in Equation 5. The autocompensation can be tuned to the component e2, and the process repeated until all components of e have been treated. The result, then, is a signal free of phase corruption.

Even when the residual motion e is purely sinusoidal, it may still be necessary to tune the autocompensator 76 to more than one frequency. For one thing, when e is sampled as in Equation 5, energy will usually be found in several of the integer frequencies adjoining the nominal characteristic frequency, unless the latter itself happens to be an integer frequency. For another, the determination of the power spectral density of e may not be exact. One further reason is that the aircraft may not be flying at a constant angular velocity relative to the map center, so that the residual motion, though a pure sinusoidal motion in the body axis, may not be so along the line of sight. Tuning the autocompensator 76 to bands of several frequencies surrounding each nominal characteristic frequency solves these problems.

The sections above have implied that each characteristic residual motion component is removed before the next one is estimated. Computational speed can be improved if the removal is done only after all the estimates are obtained (i.e., the same corrupted image g is used in the estimation of all the characteristic motion components). The reason is that the extra computational load incurred by auto-compensation is mainly one extra fast Fourier transform (FFT) of Equation 5 for each range line, in addition to the original FFT created from the corrupted image. The extra FFT could be replaced by some short convolutions $$f = k1 * k2 * \ldots * g, \qquad \text{Eq. 10}$$

the inverse relation of that given in Equation 6. Here k1, k2, ... are the DFTs of $\exp(-je1)$, $\exp(-je2)$, ... respectively.

Figure 10:
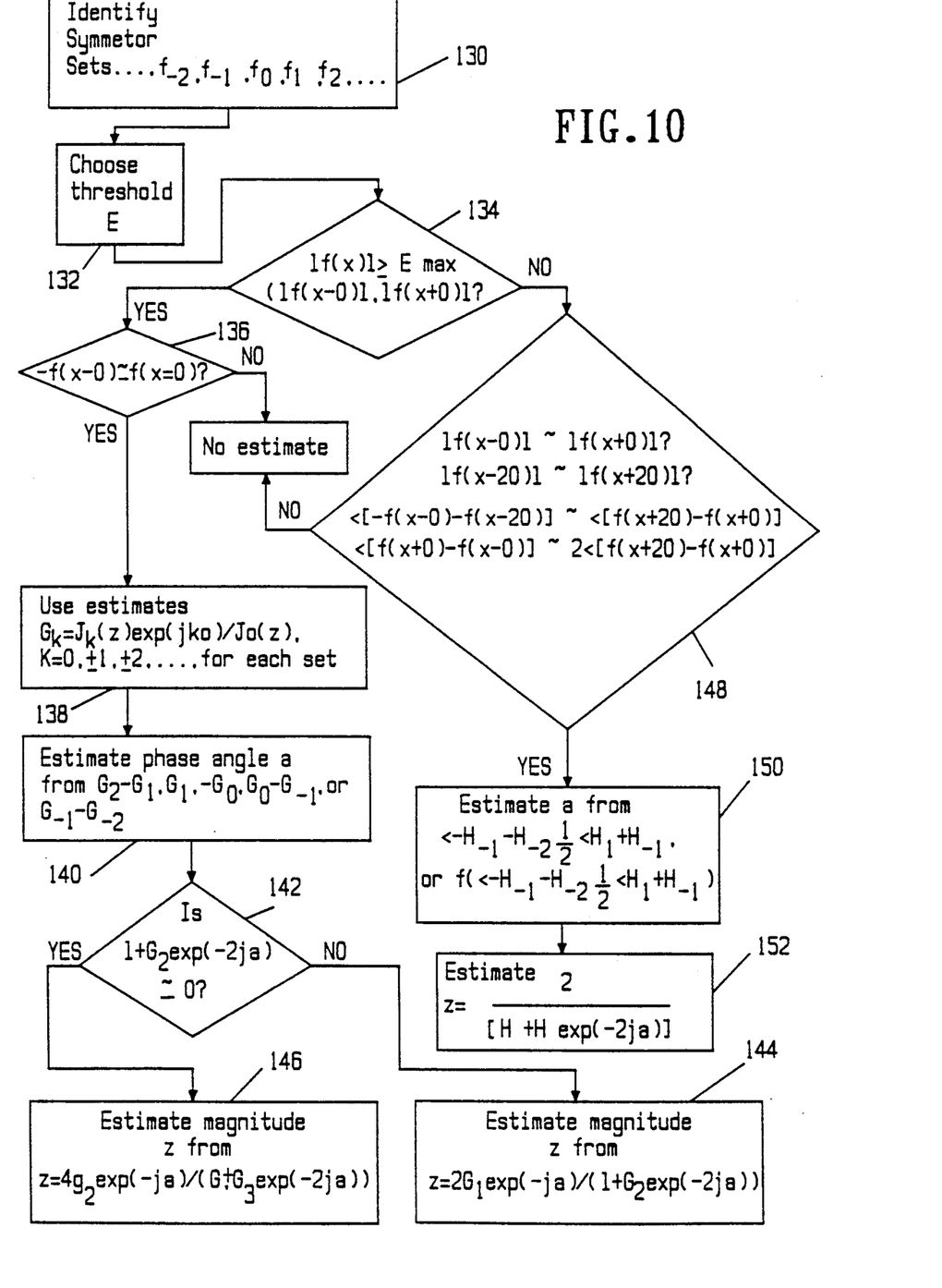
FIG. 10 is a flow chart of a method of estimating the magnitude and angle of residual antenna motion which is corrupting the measurements made by an SAR system of the type shown in FIG. 3.

As shown in the flow chart of FIG. 10, the angle and magnitude of the residual antenna motion can be estimated from the symmetric sets $\ldots, f_{-2}, f_{-1}, f_0, f_1, f_2, \ldots$ After the symmetric sets are identified (block 130), and a suitable threshold is chosen (block 132), a decision is made in decision block 134 as to how the magnitude of f(x) ($|f(x)|$) compares to the product of the threshold $\epsilon$ and the greater magnitude of the two first side lobes, $f(x+\theta)$ and $f(x-\theta)$.

If the main lobe is greater, it is next necessary to determine whether the magnitudes of the two first side lobes are approximately equal (block 136). If they are not approximately equal, the residual antenna motion cannot be accurately estimated. However, if the two first side lobes have approximately equal magnitudes, the estimates $G_k = J_k(z) \exp(jka)/J_0(z)$ are developed (block 138) and estimates of the phase angle a determined from differences between the consecutive estimates $G_k$ (block 140).

Next, the magnitude of the corrupting residual antenna motion is determined, based on whether the quantity $1 + G_2\exp(-2ja)$ is approximately zero (block 142). If not, the magnitude z is estimated from the equation $z = 2G_1\exp(ja)/[1 + G_2\exp(-2ja)]$ (block 144). Otherwise, the magnitude z is estimated from the equation $z = 4G_2\exp(-ja)/[G_1 + G_3\exp(-2ja)]$ (block 146).

If the magnitude of f(x) ($|f(x)|$) is less than the product of the threshold $\epsilon$ and the greater magnitude of the two first side lobes, $f(x+\theta)$ and $f(x-\theta)$ (block 134), a second set of conditions must be met before an estimate of the phase and magnitude of the residual antenna motion can be made. These four conditions are that 1) the magnitudes of the two first order side lobes must be approximately equal, 2) the magnitudes of the two second order side lobes must be approximately equal, 3) the angle between the first and second order side lobes below the main lobe must be approximately equal to the angle between the first and second orders side lobes above the main lobe, and 4) the angle between the two first order side lobes must be approximately equal to twice the angle between the first and second orders side lobes above the main lobe. This decision is accomplished in decision block 148.

If the foregoing four conditions are not all met, this method does not produce an estimate of the residual antenna motion. If they are, however, the angle a can be estimated from the angles of $-H_1-H_2$, or half the angle of $H_1+H_{-1}$, or from a combination of these angles (block 150). The magnitude z can then be estimated by $z=2/[H_0+H_2\exp(-2ja)]$ (block 152).

Computational time can also be reduced by using only a portion of the image to estimate the residual motion. In tests of this method, the performance of the autocompensator 76 as measured by the reduction in the peak-to-sidelobe ratio, degraded by only 3 dB.

This method has been partially tested with a computer simulation, starting with a set of reflectivity data having magnitude only (dynamic range=50 dB), for 300 range lines and 256 azimuth cells in each range line. Phases for these reflectivity values were generated randomly, resulting in 300*256 values of $f_m$. The integration time is normalized to 1 second. In each test case, then, a residual motion is generated and used to corrupt the phase of the signal as in Equation 5. Only a range of the motion frequencies is input to the autocompensator 76, which is tuned to this range of frequencies. As a measure of the severity of the image corruption due to the residual motion the peak-to-sidelobe ratio (PSLR) for a point reflector is computed. This is done before and after the autocompensation. In all the test cases, an improvement of better than 20 dB in this ratio was achieved. The simulation results are summarized in Table I. Note that case 5 is identical to case 2 except that only half of a scene is used in the autocompensation. The performance degraded by only 3dB. This experiment suggests the feasibility of the Third Order Tuned Autocompensator.

TABLE

Tuned Autocompensator for Residual Antenna Motion on SARs

| Case | Residual | PSLR(dB) | Auto | PSLR(dB) | Improv |
|---|---|---|---|---|---|
| 1 | (12.3,.5,0) + (18.1,5.1) | 12.9 | 8–22 Hz | 36.2 | 23.3 |
| 2 | (12.3,.3,0) + (18.1,.2.1) | 17.6 | 8–22 Hz | 41.0 | 23.4 |
| 3 | (12.4,.2.1) | 22.3 | 9–16 Hz | 42.3 | 20.0 |
| 4 | (12.1,.2.0) + (13.4,.2,2) + (14.3,.2,4) | 19.7 | 8–17 Hz | 39.7 | 20.0 |
| 5 | same as 2, half a scene used. | 17.6 | 8–22 Hz | 38.1 | 20.5 |

While the foregoing discussion of the preferred embodiments has been carried out in terms of specific configurations, one skilled in the art will recognize that there modifications to the disclosed methods can be made without departing from the spirit of the invention. Accordingly, the scope of the present invention is to be determined only by the following claims.

I claim:

1. In a SAR system that receives reflections of radar signals from a target region, wherein such signals are combined with position signals from a motion sensor indicating antenna position, with the reflected signals and the position signals being integrated into range lines that may be combined to form a radar image, and wherein there may be residual motion between the antenna and the motion sensor, a method of correcting the position signals from the motion sensor to compensate for the amplitude and phase of antenna residual motion that may cause phase corruption in the radar image, the method comprising the steps of:

a. transforming a received radar signal into a range line having a plurality of azimuth positions, b. transforming said received signal into a frequency spectrum f indicating the reflectivity of point reflectors at said azimuth positions, wherein one point reflector is located at each azimuth position, and wherein each point reflector is represented by a complex number having a certain magnitude and phase angle;

c. sampling the range line for substantially symmetric sets of point reflectors separated consecutively from each other by a distance corresponding to a frequency $\theta$, wherein said frequency corresponds to a mode of residual vibration of the antenna, and wherein said substantially symmetric set includes a main lobe point reflector, a pair of first order point reflectors, and a pair of second order point reflectors, each of said point reflectors being represented by a complex number, with said main lobe point reflector being centrally positioned between said pairs of first and second order point reflectors, d. calculating a product of a predetermined threshold with the greater magnitude of the two complex numbers $f(x-\theta)$ and $f(x+\theta)$, representing the pair of first order point reflectors, e. comparing the product with the magnitude of the complex number $f(x)$ representing the main lobe point reflector, f. establishing first and second criteria of a symmetry relation, depending upon whether the magnitude of the complex number representing the main lobe point reflector is greater or less than the product of the predetermined threshold with the greater magnitude of the two complex numbers representing the pair of first order point reflectors, g. determining whether the complex numbers representing the main lobe point reflector, the pair of first order point reflectors, and the pair of second order point reflectors meet the first or second symmetry relation, depending upon the result of the comparison of step e, h. calculating estimates of the amplitude and phase of the antenna residual motion, depending upon the result of the comparison of step e, i. generating an antenna residual motion signal therefrom, and j. combining the antenna residual motion signal with the position signals from the motion sensor, to correct for antenna residual motion between the motion sensor and the antenna.

2. The method of claim 1 wherein the first criterion is that $-f(x-\theta)$ and $f(x+\theta)$ are approximately mirror images of each other relative to a line in the complex plane through the origin and $f(x)$.

3. The method of claim 1 wherein the second criterion is the simultaneous satisfaction of the following approximate equivalances:

(i) $|f(x-\theta)| \sim |f(x+\theta)|$, (ii) $|f(x-2\theta)| \sim |f(x+2\theta)|$, (iii) Angle of $-f(x-\theta)-f(x-2\theta) \sim$ angle of $f(x+2\theta)-f(x+\theta)$, and (iv) Angle of $f(x+\theta)-f(x-\theta) \sim$ twice the angle of $f(x+2\theta)-f(x+\theta)$, where, for two numbers u and v, the symbol $u \sim v$ means $|u-v| < \epsilon_1 (1 + |u| - |v|)$ for some threshold $\epsilon_1$, and where all angles take values in the interval $[0, 2\pi)$.

4. The method of claim 3 wherein the first criterion is that $-f(x-\theta)$ and $f(x+\theta)$ are approximately mirror images of each other relative to a line in the complex plane through the origin and $f(x)$.

5. The method of claim 2 wherein estimates $G_k$ are produced, the $G_k$ being estimates for $J_k(z)\exp(jka)/J_0(z)$ and being averaged from values of $f(x+k\theta)/f(x)$, the phase angle $a$ is estimated from the angle of $G_1-G_0, G_0-G_{-1}, -G_{-1}-G_{-2}$, or $G_2-G_1$, or from a combination of these angles, and the magnitude $z$ is estimated by $z = 2G_1 \exp(-ja)/[1+G_2 \exp(-2ja)]$ when $1+G_2\exp(-2ja)$ is not approximately zero, or by $z = 4G_2 \exp(-ja)/(G_1+G_3 \exp(-2ja))$ if $1+G_2 \exp(-2ja)$ is approximately zero.

6. The method of claim 3 wherein estimates $h_k$ are produced, the $h_k$ being the respective estimates $h_k$ for $J_k(z)\exp(jka)/J_0(z)$ $(k=-2,-1,0,1,2)$ are being generated by dividing the symmetric quintuple set $f(x-2\theta)$, $f(x-\theta)$, $f(x)$, $f(x+\theta)$, and $f(x+2\theta)$ by $f(x+\theta)$ and rotating the resulting complex numbers by the angle given in condition iii), the phase angle $a$ is estimated from the angles of $-H_{-1}-H_{-2}$, or half the angle of $H_1+H_{-1}$, or the angle of $H_2-H_1$, or from a combination of these angles, and the magnitude $z$ is estimated by $$z = 2/(H_o + H_2 \exp(-2ja)).$$

7. An autocompensator for an SAR system that receives reflections of radar signals from a target region, wherein such signals are combined with position signals from a motion sensor indicating antenna position, with the reflected signals and the position signals being integrated into range lines that may be combined to form a radar image, and wherein there may be residual motion between the antenna and the motion sensor, the autocompensator comprising:

means for transforming a received radar signal into a range line having a plurality of azimuth positions, means for transforming said received signal into a frequency spectrum f indicating the reflectivity of point reflectors at said azimuth positions, wherein one point reflector is located at each azimuth position, and wherein each point reflector is represented by a complex number having a certain magnitude and phase angle;

means for sampling the range line for substantially symmetric sets of point reflectors separated consecutively from each other by a distance corresponding to a frequency $\theta$, wherein said frequency corresponds to a mode of residual vibration of the antenna, and wherein said substantially symmetric set includes a main lobe point reflector, a pair of first order point reflectors, and a pair of second order point reflectors, each of said point reflectors being represented by a complex number, with said main lobe point reflector being centrally positioned between said pairs of first and second order point reflectors, means for calculating a product of a predetermined threshold $\epsilon$ with the greater magnitude of the two complex numbers $f(x-\theta)$ and $f(x+\theta)$, representing the pair of first order point reflectors, means for comparing the product with the magnitude of the complex number $f(x)$ representing the main lobe point reflector, means for establishing first and second criteria of a symmetry relation, depending upon whether the magnitude of the complex number representing the main lobe point reflector is greater or less than the product of the predetermined threshold with the greater magnitude of the two complex numbers representing the pair of first order point reflectors, means for determining whether the complex numbers representing the main lobe point reflector, the pair of first order point reflectors, and the pair of second order point reflectors meet the first or second symmetry relation, depending upon the result of the comparison of the product with the magnitude of the complex number $f(x)$ representing the main lobe point reflector, means for calculating estimates of the amplitude and phase of the antenna residual motion, depending upon the result of the comparison of the product with the magnitude of the complex number $f(x)$ representing the main lobe point reflector, and means for generating an antenna residual motion signal therefrom, wherein the autocompensator corrects the position signals from the motion sensor to compensate for the amplitude and phase of antenna residual motion that may cause phase corruption in the radar image.

8. The autocompensator of claim 7 wherein the means for transforming said received signal into a frequency spectrum f is a means for performing a discrete Fourier transform.

9. The autocompensator of claim 8 wherein the means for performing a discrete Fourier transform is a means for performing a fast Fourier transform.

10. The autocompensator of claim 7 wherein the means for sampling the range line, the means for calculating a product of a predetermined threshold $\epsilon$ with the greater magnitude of the two complex numbers $f(x-\theta)$ and $f(x+\theta)$, the means for comparing the product with the magnitude of the complex number $f(x)$ representing the main lobe point reflector, the means for establishing first and second criteria of a symmetry relation, the means for determining whether the complex numbers representing the main lobe point reflector, the pair of first order point reflectors, and the pair of second order point reflectors meet the first or second symmetry relation, the means for calculating estimates of the amplitude and phase of the antenna residual motion, and the means for generating an antenna residual motion signal are a programmed computer.

11. An SAR system, comprising:

means for transmitting radar signals to a target region;

means for receiving the reflections of the radar signals from the target region;

means for producing position signals from a motion sensor indicating antenna position;

an autocompensator comprising:

means for transforming a received radar signal into a range line having a plurality of azimuth positions, means for transforming said received signal into a frequency spectrum f indicating the reflectivity of point reflectors at said azimuth positions, wherein one point reflector is located at each azimuth position, and wherein each point reflector is represented by a complex number having a certain magnitude and phase angle, means for sampling the range line for substantially symmetric sets of point reflectors separated consecutively from each other by a distance corresponding to a frequency $\theta$, wherein said frequency corresponds to a mode of residual vibration of the antenna, and wherein said substantially symmetric set includes a main lobe point reflector, a pair of first order point reflectors, and a pair of second order point reflectors, each of said point reflectors being represented by a complex number, with said main lobe point reflector being centrally positioned between said pairs of first and second order point reflectors, means for calculating a product of a predetermined threshold $\epsilon$ with the greater magnitude of the two complex numbers $f(x-\theta)$ and $f(x+\theta)$, representing the pair of first order point reflectors, means for comparing the product with the magnitude of the complex number $f(x)$ representing the main lobe point reflector, means for establishing first and second criteria of a symmetry relation, depending upon whether the magnitude of the complex number representing the main lobe point reflector is greater or less than the product of the predetermined threshold with the greater magnitude of the two complex numbers representing the pair of first order point reflectors, means for determining whether the complex numbers representing the main lobe point reflector, the pair of first order point reflectors, and the pair of second order point reflectors meet the first or second symmetry duct with the magnitude of the complex number $f(x)$ representing the main lobe point reflector, means for calculating estimates of the amplitude and phase of the antenna residual motion, depending upon the result of the comparison of the product with the magnitude of the complex number $f(x)$ representing means for generating an antenna residual motion signal therefrom; and means for correcting the position signals from the motion sensor to compensate for the amplitude and phase of antenna residual motion that may cause phase corruption in the radar image.

12. The SAR of claim 11, further comprising means for forming a radar image from the position signals which have been compensated for the amplitude and phase of the antenna residual motion.

13. The SAR of claim 11 wherein the means for transmitting radar signals to a target region comprises oscillator means for generating a stable frequency, transmitter means for modulating a carrier signal at the stable frequency to produce the radar signals, duplexer means connected to the transmitter means for transmitting the radar signal, and antenna means connected to the duplexer means for transmitting the radar signal to the target region.

14. The SAR of claim 11 wherein the means for receiving radar signals from the target region comprises oscillator means for generating a stable frequency, antenna means for receiving the radar signal from the target region, duplexer means connected to the antenna means for transmitting the received radar signal, and receiver means connected to the duplexer means and the oscillator means for producing signals representing the reflections of the radar signals from the target region.

15. The SAR of claim 11 wherein the means for producing position signals from the motion sensor is an inertial navigation system.

* * * * *

UNITED STATES PATENT AND TRADEMARK OFFICE
CERTIFICATE OF CORRECTION

PATENT NO. : 5,012,249

DATED : April 30, 1991

INVENTOR(S) : Yuen-Kwok Chan

It is certified that error appears in the above-identified patent and that said Letters Patent is hereby corrected as shown below:

In column 17, claim 3, line 2, please delete "$|u-v| < \epsilon_1 \; (1+ |u| - |v|)$" and substitute therefor --$|u-v| < \epsilon_1 \; (1+ |u| + |v|)$--.

In column 17, claim 5, line 12, after "$G_0 - G_{-1}$," please delete "$-G_1 - G_{-2}$," and substitute therefor -- $-G_{-1} - G_{-2}$, --.

In column 17, claim 6, line 20, please delete "are" and substitute therefor --and--.

In column 19, claim 11, line 33, please delete "duct" and after "symmetry" please insert --relation, depending upon the result of the comparison of the product--.

In column 20, claim 11, line 3, after "representing" please insert --the main lobe point reflector, and--.

Signed and Sealed this

Twenty-fifth Day of August, 1992

Attest:

DOUGLAS B. COMER

Attesting Officer     Acting Commissioner of Patents and Trademarks